United States Patent [19]

Carron

[11] Patent Number: 4,964,099

[45] Date of Patent: Oct. 16, 1990

[54] METHOD OF ESTABLISHING A STRATIGRAPHIC MODEL OF THE SUBSURFACE FROM AN ACOUSTIC IMPEDANCE PROFILE AND A SEISMIC SECTION

[75] Inventor: Didier Carron, Saint Maur des Fossés, France

[73] Assignee: Schlumberger Technology Corporation, New York, N.Y.

[21] Appl. No.: 365,465

[22] Filed: Jun. 13, 1989

[30] Foreign Application Priority Data

Jun. 13, 1988 [FR] France ............................. 88 07818

[51] Int. Cl.$^5$ ............................................. G01V 1/28
[52] U.S. Cl. ....................................... 367/73; 364/421
[58] Field of Search ................. 364/421, 422; 367/73, 367/74, 63

[56] References Cited

U.S. PATENT DOCUMENTS 4,841,490  6/1989  Carron ................................. 367/38

FOREIGN PATENT DOCUMENTS 0186569  7/1986  European Pat. Off. .

OTHER PUBLICATIONS

P. A. Grivelet, "Inversion of Vertical Seismic Profiling by Iterative Modeling", Geophysics, vol. 50, No. 6, pp. 924–930 (Jun. 1985).

Primary Examiner—Ian J. Lobo
Attorney, Agent, or Firm—Clifford L. Tager

[57] ABSTRACT

A method of establishing a stratigraphic model of the subsurface from an acoustic impedance profile $A_o = \{a_o(n), n=1,N\}$ corresponding to a series of reflection coefficients $R_o = \{r_o(n), n=1,N\}$, where n is an index relating to the depth sampled in time t, and from a seismic section comprising a plurality of seismic traces $T_i(t), i=0,I$ recorded in response to the emission of a seismic wave of signature $W(t)$, the method comprising the following steps:

successively determining each series of coefficients $R_i = \{r_i(n), n=1,N\}$ by minimizing a cross-entropy function $H(R_i/\underline{R}_i)$ between firstly a series $\underline{R}_i$ obtained from the series $R_{i-1}$ and a set of one or more seismic traces $\{T_{i-j}, T_{i+j}\}$, and secondly the looked-for series $R_i$, said minimization being performed under pre-established constraints; and determining the acoustic impedance profiles $A_i = \{a_i(n)\}$ corresponding to the series $R_i$.

22 Claims, 7 Drawing Sheets

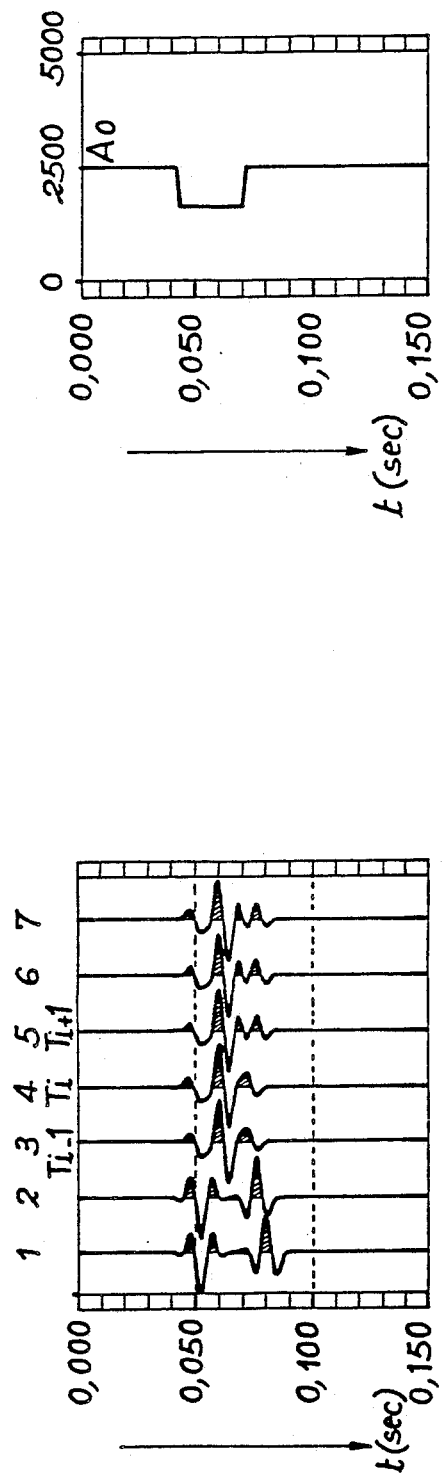
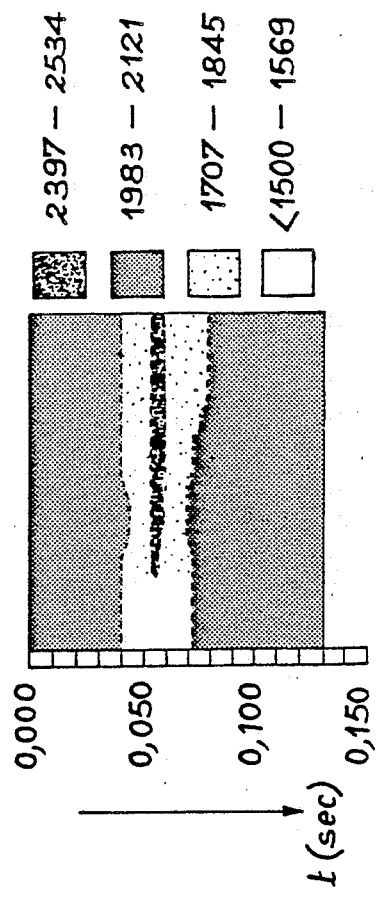
FIG. 8
FIG. 9
FIG. 10

METHOD OF ESTABLISHING A STRATIGRAPHIC MODEL OF THE SUBSURFACE FROM AN ACOUSTIC IMPEDANCE PROFILE AND A SEISMIC SECTION

FIELD OF THE INVENTION

The invention relates to a method of establishing a stratigraphic model of the subsurface from an acoustic impedance profile and a seismic section.

BACKGROUND OF THE INVENTION

Establishing a stratigraphic model of the subsurface at a given location serves to discover its structure, i.e. the nature, the position, and the shape of the various geological strata from which it is built up.

When seismic measurements are taken, the seismic signal picked up by a detector is the response of the variations in acoustic impedance of the geological formations to an emitted sound wave. The acoustic impedance of a formation is defined as being the product of the density of the medium multiplied by the propagation velocity of the seismic wave through the medium.

The acoustic impedance profile at a given location corresponds mathematically to a sequence of interface surfaces and the problem is to define the number N of such interfaces, their geometrical positions, and their values of acoustic impedance $A = \{a_i(n), n=1, N\}$. In equivalent manner, the impedance profile is defined by a sequence of reflection coefficients $R_i = \{r_i(n), n=1, N\}$ at the interfaces, with values being given by the equation:

$$r_i(n) = [(a_i(n) - a_i(n-1)]/[(a_i(n) + a_i(n-1)]$$

In order to obtain the acoustic impedance profile at a given location, borehole logging measurements are taken or else downhole seismic measurements are taken.

Borehole logging and downhole seismic measurements can only be performed when a drilled well is available.

Downhole seismic measurements consist in placing receivers at spaced-apart intervals along the borehole A source for emitting sound waves is placed on the surface in the same zone as the borehole.

Whenever the source emits sound, the emitted energy propagates through the ground and encounters successive geological strata (or formations) These strata act as semitransparent reflectors which reflect a portion of the energy. When the reflectors are located beneath the receivers, the reflected energy is picked up and recorded by each of the receivers, with the energy reaching each receiver after a time delay related to the distance of the receiver from the source and to the propagation velocity through the strata. Each receiver also receives a direct wave coming from the source by transmission through the various strata.

A multiplicity of measurements are taken by moving the source over the surface or by moving the receivers along the borehole, or vice versa.

Logging measurements consist in measuring physical parameters along the borehole These measurements make it possible to obtain a high resolution curve representing the nature of the rock along the borehole. By studying such logs, it is possible to define the probable positions of the interfaces, i.e. of the locations where there are changes in the nature of the strata, and these positions can be determined with very good precision along the borehole since, firstly the measurements are performed at a sampling interval which is smaller than the sampling interval used for seismic measurements, and secondly because the frequency band used is narrower than that used for seismic measurements with the signal emitted for seismic measurements being incapable of obtaining measurements with a high degree of precision.

When an acoustic impedance profile is searched at a given location from a seismic section, a conventional technique is to invert the seismic signals, and in particular the vertical seismic profile (VSP) signals.

Before performing any downhole seismic measurements or any borehole logging, seismic measurements are performed on the surface in order to establish a seismic section. A seismic section is a picture of the subsurface made from all the seismic traces recorded by a set of receivers when a seismic wave is emitted by a source, with the source and the receivers being spaced apart on the surface of the ground.

The underground geological strata act as semitransparent reflectors with a portion of the incident waves being reflected at each interface between two strata while the remainder of the energy is transmitted towards lower strata.

A given geological stratum reflects a portion of the received wave to each of the receivers on the surface Each receiver picks up the energy reflected from each stratum and each receiver records the energy reflected by a given stratum after a time delay related to its distance from the source.

The purpose of all these measurements, i.e. downhole seismic measurements, surface seismic measurements, and borehole logging, is to establish the values of the reflection coefficients at the interfaces between the various strata together with the positions of said interfaces in order to deduce the corresponding acoustic impedances, with the impedance of stratum being a function of its nature. It is thus possible to obtain a stratigraphic image of the subsurface.

As already mentioned, borehole logging serves to obtain the acoustic impedance profile at a borehole with very high precision.

Downhole seismic measurements give acoustic impedance profiles with fairly good precision over a small lateral extent.

Surface seismic measurements give acoustic impedance profiles over a wide lateral extent but with fairly low precision.

The object of the present invention is to provide a method of obtaining successive acoustic impedance profiles along a seismic section with high precision close to that obtained with borehole logging, and with a lateral extent similar to that obtained with surface seismic measurements, in order to establish a stratigraphic model of the subsurface under consideration.

SUMMARY OF THE INVENTION

The present invention therefore provides a method of establishing a stratigraphic model of the subsurface from an acoustic impedance profile $A_o = \{a_o(n), n=1, N\}$ corresponding to a series of reflection coefficients $R_o = \{r_o(n), n=1, N\}$, where n is an index relating to the depth sampled in time t, and from a seismic section comprising a plurality of seismic traces $T_i(t), i = 0, I$ recorded in response to the emission of a seismic wave of signature $W(t)$, the method comprising the following steps:

successively determining each series of coefficients $R_i=\{r_i(n), n=1,N\}$ by minimizing a cross-entropy function $H(\underline{R}_i/\underline{R}_1)$ between firstly a series $\underline{R}_j$ obtained from the series $\underline{R}_{i-1}$ and a set of one or more seismic traces $\{T_{i-j}, T_{i+j}\}$, and secondly the looked-for series $R_i$, said minimization being performed under pre-established constraints; and Ai determining the acoustic impedance profiles $A_i=\{a_i(n)\}$ corresponding to the series $R_i$.

Advantageously, the pre-established constraints include constraints related to the noise observed on the traces $T_i(t)$.

Advantageously, the pre-established constraints include constraints related to geology.

Advantageously, the pre-established constraints include constraints related to the frequency domain of the signature $W(\omega)$.

According to a characteristic of the invention constraints related to the noise observed on the traces $T_i(t)$ are expressed by the equation:

$$T_i^{min} < T_i * W < T_i^{max}$$

in which the values $T_i^{min}$ and $T_i^{max}$ correspond respectively to the bottom limit and the top limit obtained by correlating a plurality of traces $\{T_{i-j}, T_{i+j}\}$ on either side of the trace $T_i(t)$.

According to a characteristic of the invention, constraints related to the frequency of the signature $W(\omega)$ are expressed by the equation:

$$F(A_i(\omega)) = [V_i]$$

in which $F(A_i(\omega))$ is the Fourier transform of the acoustic impedance, $[V_i]$ is a predetermined vector and belongs to the frequency domain $[0, \omega_W]$, in which $\omega_W$ is the minimum frequency of $W(\omega)$.

In a first variant, the predetermined vector $[V_i]$ corresponds to the stacking velocities obtained from the surface seismic measurements.

In a second variant, the predetermined vector $[V_i]$ corresponds to the Fourier transform of the series of estimated reflection coefficients $\underline{R}_i$.

According to a characteristic of the invention, the method consists in determining a series $\Delta R_i = \{\Delta r_i(n)\}$ representative of a corrective value such that $R_i = \underline{R}_i + \Delta R_i$, by minimizing the cross-entropy function:

$$H(R_i/R_i) = \sum_1^N f(\Delta r_i)$$

In a first variant, the function f is given by the following equation:

$$f(\Delta R_i) = 1 - e^{|r_i(n) - r_i(n)|}$$

In a second variant, the function f is given by the following equation:

$$f(\Delta R_i) = |r_i(n) - r_i(n)|$$

Advantageously, said constraints related to geology are expressed by the equation:

$$a_i(n-1) \prod_{k=n}^{n+m} \frac{1 + r_i(k) + \Delta r_i(k)}{1 - r_i(k) + \Delta r_i(k)} = a_i(n+m+1)$$

in which $a_i(n-1)$ and $a_i(n+m+1)$ are the acoustic impedance values of two strata separated by m samples which remain constant from index $i-1$ to index $i$.

In a particular implementation of the invention, the series $\underline{R}_i$ is obtained by:

(a) initially:

determining the signature W from the seismic trace $T_o$ and the series $R_o$ by deconvolution of the equation:

$$T_o = W * R_o$$

with the operator * representing a convolution product;

determining correlation lines Lp from a plurality of traces $\{T_{i-j}, T_{i+j}\}$ on either side of the seismic trace $T_i$; and (b) then, for index i=1 to I:

calculating a series $\underline{R}_j = \{r_i(n)\}$ whose values are taken from the series $\underline{R}_{i-1}$ and rearranged in accordance with the correlation lines Lp; and performing an iterative process using the series $\underline{R}_j$ for it initial values to calculate an estimate $\underline{\underline{R}}_i$ whose convolution product with the signature W is as close as possible to the trace $T_i$.

Advantageously, the series $\underline{\underline{R}}_i$ is obtained by minimizing (in a least squares sense) the difference between the trace $T_i$ and the convolution product $\underline{R}_i * W$:

$$\min ||\underline{R}_i * W - T_i||^2 \text{ by using the series } \underline{R}_j \text{ for the initial values.}$$

According to another aspect of the invention, the series $\underline{R}_i$ is obtained in such a manner that the convolution product $\underline{R}_i * W$ lies within the interfal $[T_i^{min}, T_i^{max}]$ by minimizing the quantity outside said interval and by using the series $\underline{R}_j$ for initial values.

According to a characteristic of the invention, the series $\underline{R}_i = \{r_i(n)\}$ is calculated from the series $\underline{A}_i = \{a_i(n)\}$ using the equation:

$$\underline{r}_i(n) = [(a_i(n) - a_i(n-1)]/[(a_i(n) + a_i(n-1)]$$

where the series $\underline{A}_i$ is such that $a_i(L) = a_{i-1}(q)$ situated on the same correlation line Lp, or between two same correlation lines.

In the event that two correlation lines converge on trace i, then the acoustic impedance situated between these two lines on trace i-1 will have no correspondent on trace i.

In a variant implementation of the method of the invention, the reflection coefficients defined by the series $R_o$ are redetermined by estimating noise by correlation over a plurality of traces on either side of the trace $T_o$ in such a manner as to obtain a lower limit $T_o^{min}$ and an upper limit $T_o^{max}$, and then by seeking a series $R_o$ by deconvolution of the trace $T_o$ and the signature W within the limits imposed by the lower and upper limits $T_o^{min}$ and $T_o^{max}$.

Advantageously, the reflection coefficients of the series $R_o$ are redetermined in a manner which includes the following stage:

minimizing the function $|\Delta R_o|$ representative of a series of corrective values for $R_o$ under pre-established constraints.

Advantageously, the reflection coefficients of the series $R_o$ are redetermined under constraints related to the noise observed on the trace $T_o$, expressed by the equation:

$$T_o^{min} > (R_o + \Delta R_o) W < T_o^{max}$$

Advantageously, the reflection coefficients of the series $R_o$ are redetermined under constraints related to the frequency domain of the signature $W(\omega)$.

According to another characteristic of this variant, constraints related to the frequency domain of the signature $W(\omega)$ are expressed by the equation:

$$F(A'_o(\omega)) = F(A_o(\omega))$$
$$\omega \epsilon [0, \omega_{\overline{W}}]$$

in which $A'_o$ is the acoustic impedance profile associated with the series $R'_o = R_o + \Delta R_o$, where $F(A'_o(\omega))$ is the Fourier transform of said impedance profile and $F(A_o(\omega))$ is the Fourier transform of the acoustic impedance $A_o$.

BRIEF DESCRIPTION OF THE DRAWINGS

Other characteristics and advantages appear from reading the following description made with reference to the accompanying drawings, in which:

FIG. 8 shows a seismic section by way of example;

FIG. 9 shows an impedance profile $A_o$ by way of example; and

FIG. 10 shows a stratigraphic model of the subsurface obtained by the method of the invention.

DESCRIPTION OF THE PREFERRED EMBODIMENTS

The method of the invention consists in obtaining successive acoustic impedance profiles along a seismic section to a precision close to that which may be obtained from downhole seismic measurements or from borehole logging, together with a lateral extent corresponding to that of surface seismic measurements.

The method thus proposes to establish a stratigraphic model of the subsurface from a known acoustic impedance profile $A_o$ at a given location and from a seismic section comprising a plurality of traces $T_i(t)$, $i=0$ to $I$ recorded in response to the emission of a seismic wave having a signature $W(t)$. The acoustic impedance profile $A_o = \{a_o(n), n=1, N\}$ corresponds to the series of reflection coefficients $R_o = \{r_o(n), n=1, N\}$ where n is an index relating to the depth sampled in time t.

Figure 1:
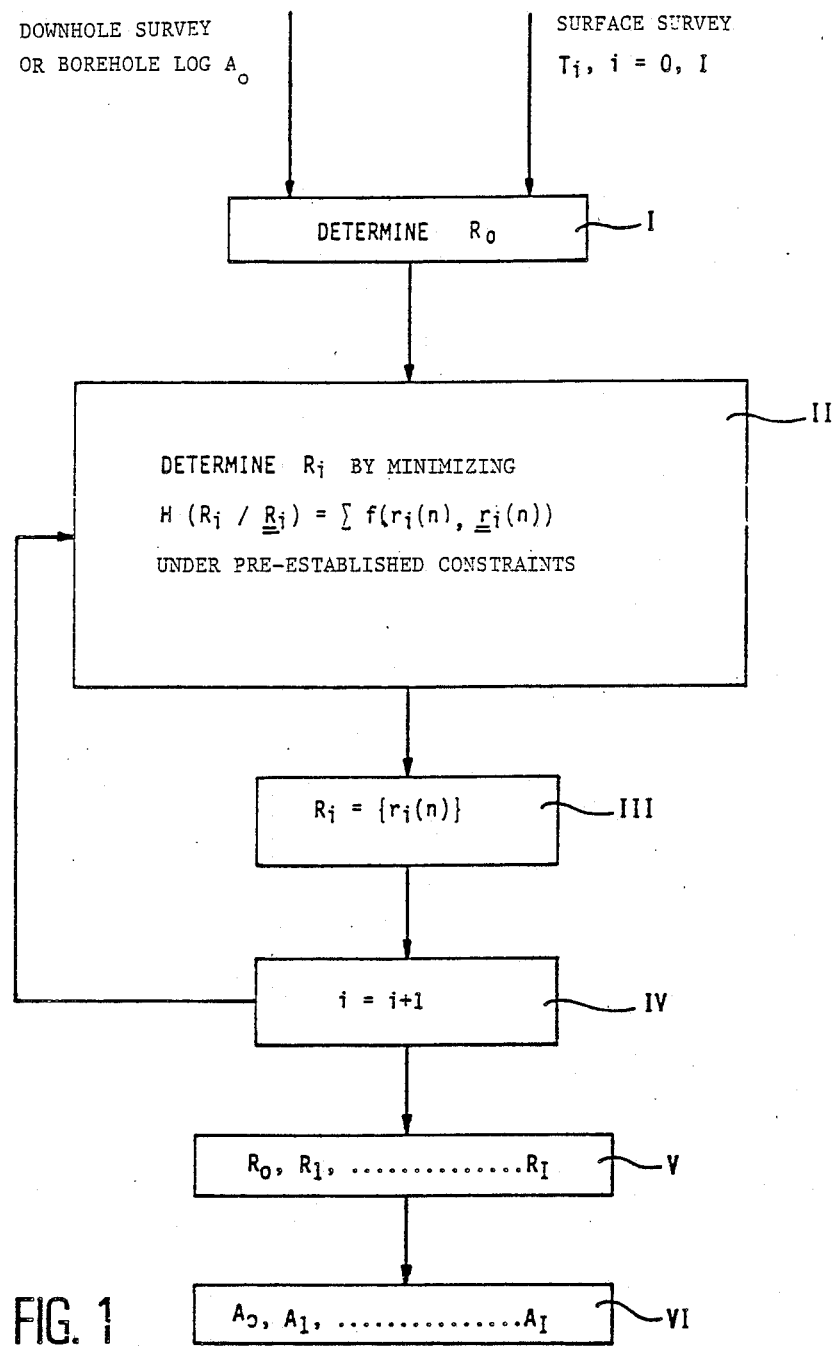
FIG. 1 shows the general outline of the method of the invention in the form of a flow chart marking the main stages.

Method of establishing a stratigraphic model (FIG. 1)

This method comprises stages I to VI.

The method consists initially in determining the series $R_o$ of seismic reflection coefficients constituted by samples $\{r_o(n), n=1, N\}$. These samples are zero or non-zero depending on whether or not they correspond to an interface existing in the ground.

Starting with this series $R_o$ of known reflection coefficients, the method consists in successively determining each series $\underline{R}_i$ corresponding to the reflection coefficients along the seismic section by minimizing a cross-entropy function H of a series $R_i$ relative to the series $R_i$ obtained from the series $R_{i-1}$ and a set of one or more traces $\{T_{i-j}, T_{i+j}\}$, with minimization being performed under pre-established constraints. Thus, by successive increments, the set comprising the series of reflection coefficients $R_o, R_1, \ldots, R_I$ is obtained, thereby making it possible to determine the acoustic impedance profiles $A_i$.

A particular solution is preferable in the domain of possible solutions when additional information is available, with said particular solution being that solution which presents a cross-entropy minimum relative to said additional information.

The pre-established constraints used for minimizing the space of possible solutions are independent from one another and may be combined without limitation on their natures.

The Applicant has chosen, by way of example, to introduce constraints related to the noise observed on the traces $T_i(t)$. The Applicant has also chosen to use constraints related to geology.

The Applicant has also chosen to introduce constraints related to the frequency domain.

However, it is specified that since the variables being manipulated are not statistical variables, the concept of cross-entropy will be considered in a broader form which retains the essential properties of cross-entropy, in particular the growth in entropy as a function of dispersion in the variables.

Work done by the Applicant has led to cross-entropy type functions being defined in a general manner between two variables such that the functions are positive, concave, and zero if and only if both of the variables are equal. Of possible functions of the cross-entropy type which are positive, concave, and zero if and only if both variables are equal, the Applicant most particularly prefers the function H such that:

$$H(R_i/R_j) = \sum_{1}^{N} (1 - e^{|r_i(n) - r_j(n)|})$$

or the function $H$ such that $$H(R_i/R_j) = \sum_{1}^{N} |r_i(n) - r_j(n)|$$

the second function being particularly simple to calculate.

Figure 2:
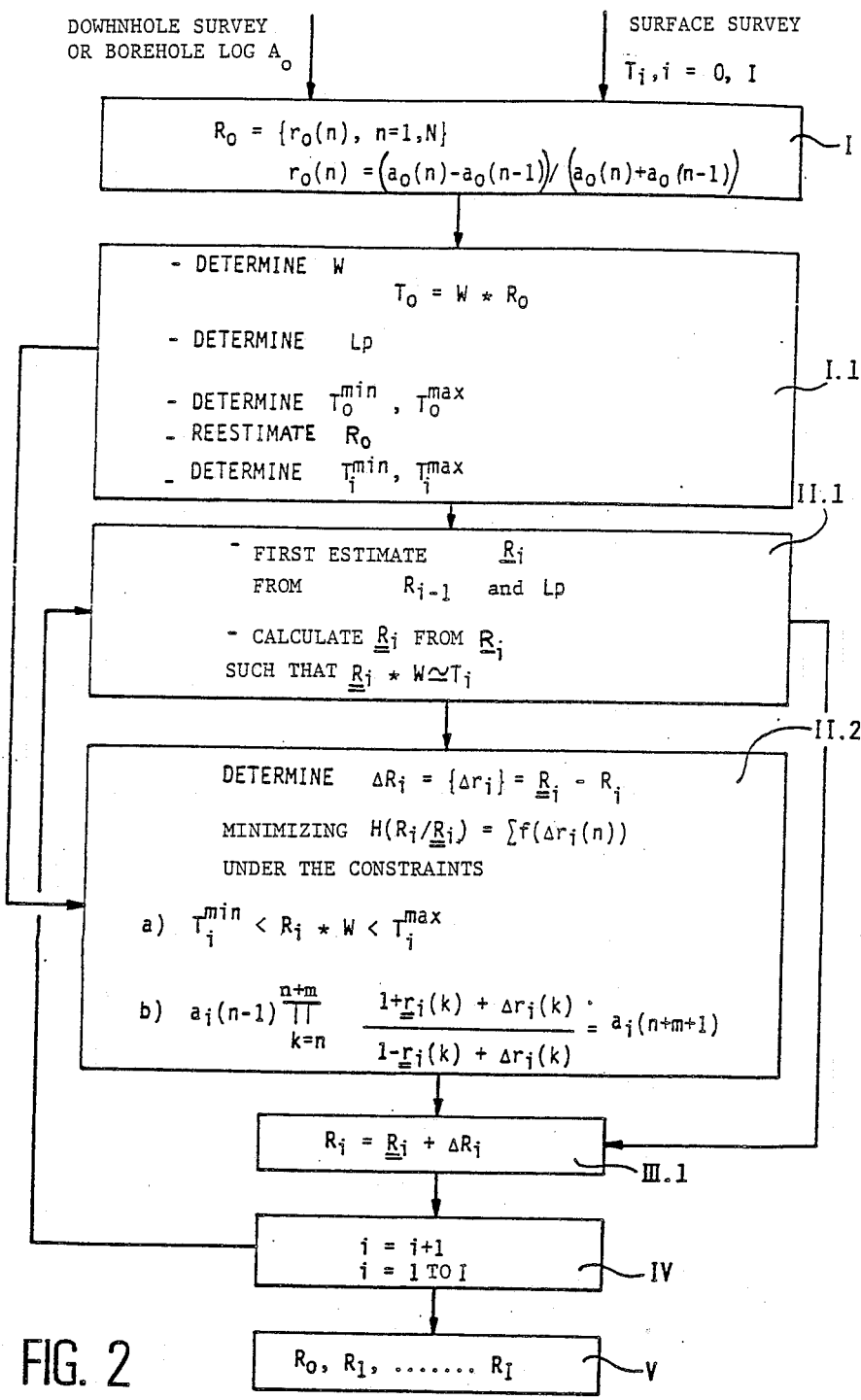
FIG. 2 is a more detailed flow chart showing a preferred implementation of the method of the invention.

FIG. 2 is a flow chart showing the successive stages in performing a particular implementation of the method in which constraints are introduced relating to noise and to geology.

The series of reflection coefficients $R_o = \{r_o(n)\}$ is determined from the equation:

$$r_o(n) = [(a_o(n) - a_o(n-1)/[(a_o(n) + a_o(n-1)] \quad (I.1, \text{FIG. 2})$$

Obtaining the series $\underline{R}_i$

The method begins by estimating the convolution signal W which is also known as the "signature" of the wave emitted by the seismic source, by performing deconvolution using the following equation:

$$T_o = W^* R_o$$

with W being calculated, for example, in the least squares sense by using the equation:

$$W = T_o(T_oT_o^t)^{-1}R_o$$

in which $T_o^t$ is the transpose of $T_o$, and $(T_oT_o^t)^{-1}$ is the inverse of $(T_oT_o^t)$.

Another initial stage consists in determining correlation lines Lp from a plurality of seismic traces $\{T_{i-j}, T_{i+j}\}$ on either side of seismic trace $T_i$ (I.1, FIG. 2) for example by performing a single time correlation or by performing image type processing on the trace which may be achieved by filtering using the Karhunen-Loeve method, or by any other conventional method.

An estimate of the noise present on the trace $T_o$ is then obtained by examining the samples encountered along a given correlation line, and lower and upper limiting traces $T_o^{min}$ and $T_o^{max}$ are determined between which the trace $T_o$ is to be found.

Figure 3:
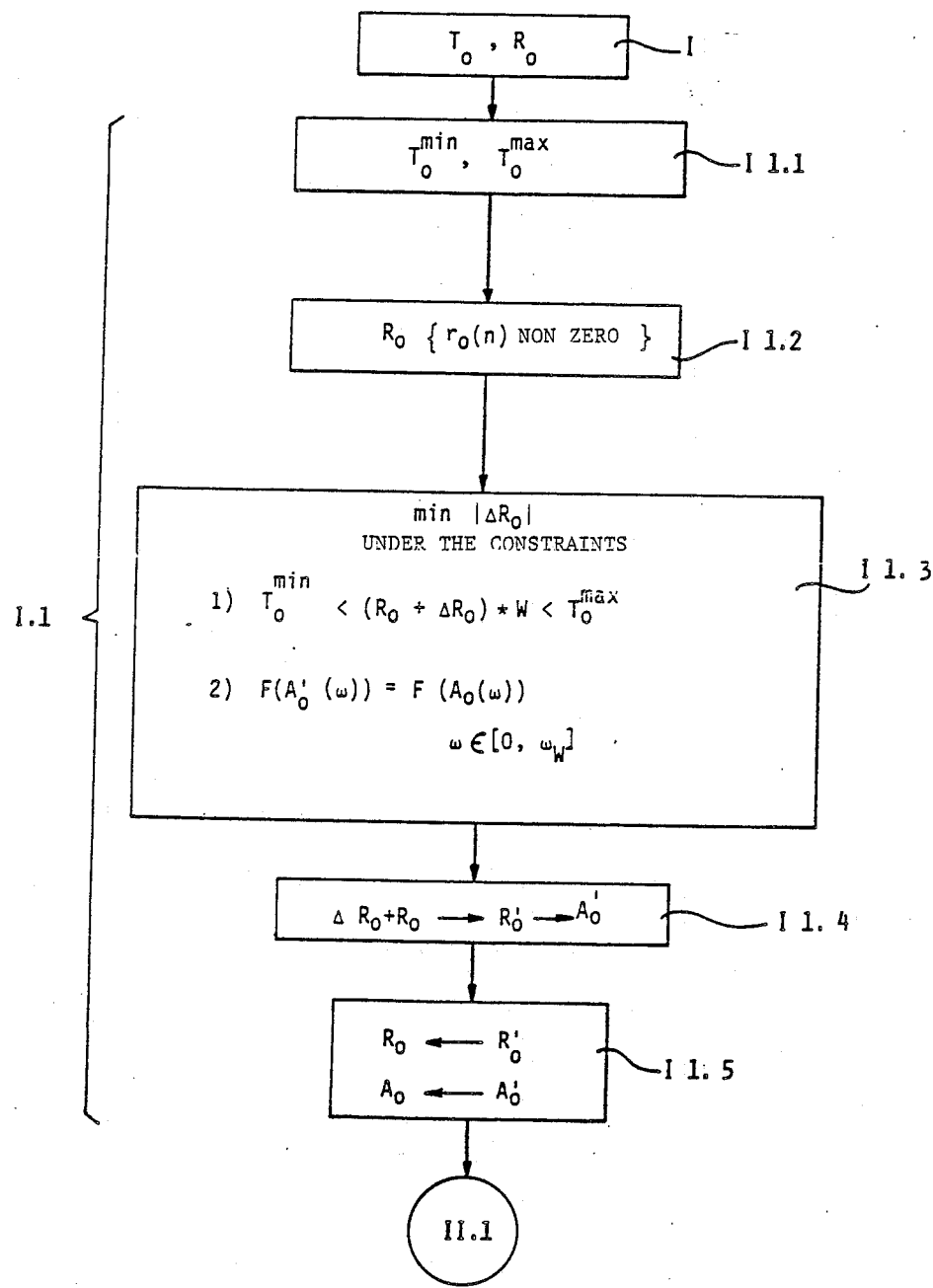
FIG. 3 shows one particular implementation of stage I.1 in the FIG. 2 flow chart.

It is also possible, at this stage, to re-estimate the series of reflection coefficients $R_o$, e.g. by performing the stages shown in detail in the flow chart of FIG. 3.

Thereafter, for indices i=1 to I (II.1, FIG. 2):

the series $\underline{R}_i = \{r_i(n)\}$ is calculated with its values being taken from the series $R_{i-1}$ and rearranged in accordance with the correlation lines Lp; and an estimate $\underline{R}_i$ is calculated using an iterative process beginning with an initial value $R_i$ such that the convolution product of the estimate by the signature W approximates as closely as possible to the trace $T_i$.

Since the cross-entropy function is minimized in this example initially under constraints which are related to noise, an estimate must previously have been made (I.1, FIG. 1) of the noise.

The constraints related to noise observed on a trace $T_i(t)$ are expressed by the equation:

$$T_i min > R_i * W < T_i max$$

The same procedure is applied to each of the traces given by the surface seismic section. Thus, each trace $T_i$ is limited by a bottom limit trace $T_i^{min}$ and a top limit trace $T_i^{max}$.

Consequently, the stage of obtaining the series $\underline{R}_i$ consists in estimating the series of reflection coefficients $R_i = \{r_i(n), n=1, N\}$, with the first estimate being designated by $R_i$, after determining the correlation lines Lp of the trace $T_i$.

Figure 6:
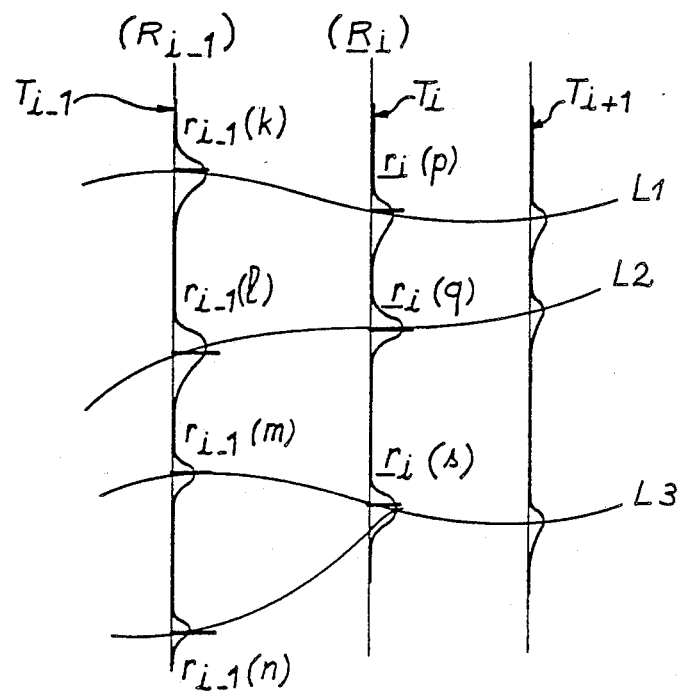
FIGS. 6 and 7 are simplified diagrams for showing seismic traces, correlation lines, and the symbolic representation of reflection coefficients.
Figure 7:
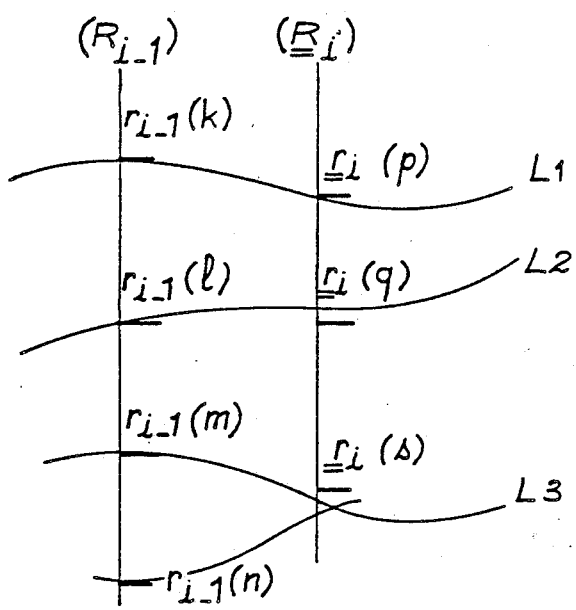

FIG. 6 is a diagram on which the traces $T_{i-1}$, $T_i$, and $T_{i+1}$ are shown diagrammatically, said traces indicating the presence of three interfaces which are marked by correlation lines $L_1$, $L_2$, and $L_3$. The figure also shows, in symbolic manner, the reflection coefficients $r_{i-1}(k)$, $r_{i-1}(l)$, $r_{i-1}(m)$, and $r_{i-1}(n)$ for the series $R_{i-1}$, and $r_i(p)$, $r_i(q)$, and $r_i(r)$ for the estimated series $R_i$.

The values of the coefficients of the series $R_i$ are deduced from the series $R_{i-1}$ and $A_{i-1}$ as follows:

along correlation lines such as L1 and L2, and between lines such as $L_1$ and $L_2$, or $L_2$ and $L_3$, is equal to $a_{i-1}$, and the reflection coefficients $r_i$ are equal to the reflection coefficients $r_{i-1}$; and at an intersection between correlation lines such as at sample s in the trace i, $a_i(s-1)$ is taken to be equal to $a_{i-1}(m-1)$ whereas $a_i(s)$ is taken to be equal to $a_{i-1}(n)$. The reflection coefficient at s is then calculated using the equation:

$$r_i(s) = [\underline{a}_i(s) - \underline{a}_i(s-1)]/[\underline{a}_i(s) + \underline{a}_i(s-1)]$$

Advantageously, the method then takes account only of non-zero coefficients, i.e. coefficients having a non-zero values and physically corresponding to the existence of an interface.

The positions of these coefficients are re-estimated by searching, for example, for the minimum of the function:

$$E = ||T_i - T_i||^2$$

in order to obtain the series $\underline{R}_i$ for which the convolution product by the signature $\overline{W}$ is as close as possible to the trace $T_i$.

The series $R_i$ can thus be obtained by minimizing the difference between the trace $T_i$ and the convolution product $\underline{R}_i * W$ in a least squares sense, as described above, or by using any other norm such as the L1 norm, for example, while nevertheless ensuring that the convolution product $\underline{R}_i * W$ remains within the interval $[T_i^{min}, T_i^{max}]$ by minimizing the quantity lying outside said interval. The series $\underline{R}_i$ is used to initialize calculation of the series $\underline{R}_i / \underline{R}_i^o = R_i$.

Obtaining a correction value $\Delta R_i$

After re-estimating the positions of the reflection coefficients and obtaining the series $R_i$ representing the new reflection coefficients, a corrective value $\Delta R_i = \{\Delta r_i\}$ is determined, with $\Delta R_i$ serving to form the final series $R_i$ by minimizing a cross-entropy function $$H(R_i/R_i) = \sum_1^N f(\Delta r_i)$$

under the pre-established constraints.

In a particular implementation, two types of constraint are inserted in order to minimize this function: noise constraints; and geological constraints.

The noise constraint is expressed by the above-mentioned equation:

$$T_i^{min} < (R_i + \Delta R_i) * W < T_i^{max}$$

The geological constraints are expressed by the equation:

$$a_i(n-1) \prod_{k=n}^{n+m} \frac{1 + r_i(k) + \Delta r_i(k)}{1 - r_i(k) + \Delta r_i(k)} = a_i(n + m + 1)$$

in which $a_i(n-1)$ and $a_i(n+m+1)$ are the acousting impedance values of two strata separated by a distance of m samples which have remained constant from index $i-1$ to index i.

The use of geological constraints makes it possible to find a series $R_i$ of reflection coefficients for the trace $T_i$ corresponding to a distribution of acoustic impedance values relating to a set of subsurface strata which is plausible relative to the preceding trace.

The stage of determining the corrective series $\Delta R_i$ is marked by the block II.2 in FIG. 2.

In order to determine the bottom and top limits $T_i^{min}$ and $T_i^{max}$ between which the trace $T_i$ is located, a correction is performed on a plurality of traces. Consequently, a noise estimate is performed on a plurality of traces, and the minimum and maximum values bracketing trace $T_i$ have been deduced therefrom.

In this stage, a search is thus made for the series of reflection coefficients $R_i = \underline{R}_i + \Delta R_i$, constituting solutions to the convolution equation limited by the limits $T_i^{min}$ and $T_i^{max}$.

The cross-entropy minimum between $R_i$ and $\underline{R}_i$ which is a function of $\Delta R_i$ is found, for example, by using the simplex algorithm as implemented in a computer program that is available on the market.

In the event that no solution is found between the limits $T_i^{min}$ and $T_i^{max}$, a corrective series $\Delta R_i$ is sought having a minimum norm which is as satisfactory as possible, and to do this the difference D defined below is minimized simultaneously.

$$D = \min[(\underline{R}_i + \Delta R_i)*W - T_i^{min}, T_i^{max} - (\underline{R}_i + \Delta R_i)*W]$$

The space of possible solutions is limited by adding in geological constraints which represent the fact that the acoustic impedance values $a_{i-1}(n)$ and $a_{i-1}(n+m)$ are the acoustic impedance values of two strata separated by a distance of m samples which have remained constant from index $i-1$ to i.

Each constraint defines a hyperplane in the space which separates a permitted domain in which solutions for the series $R_i$ may be sought from a domain in which such solutions are forbidden. Within the permitted space, we select that one of the solutions $R_i$ which gives a corrective series $\Delta R_i$ for which the cross-entropy function is at a minimum. The retained solution for the reflection coefficients is such that $R_i = \underline{R}_i + \therefore R_i$ (block II. 2 in FIG. 2).

We then move on to the following trace and begin estimating from block II.1, i.e. estimating the series $R_{i+1}$ until a set of series of reflection coefficients are obtained for all of the traces.

Re-estimating $R_o$

FIG. 3 shows the various stages in a particular implementation of the invention for re-estimating the series $R_o$.

This is done by estimating the noise in the vicinity of the trace $T_o$. The noise is estimated by correlation between a plurality of traces. This is done by marking correlation lines in the vicinity of trace $T_o$. Histograms are made along the correlation lines. The traces $T_o^{min}$ and $T_o^{max}$ or either side of the trace $T_o$ are obtained from these histograms (I.1.1, FIG. 3).

Advantageously, while re-estimating $R_o$, account is taken only of non-zero coefficients for performing the remainder of the processing. This series of non-zero coefficients (I.1.2 in FIG. 3) corresponds to existing interfaces.

Processing then continues (I.1.3 in FIG. 3) by seeking a corrective series $\Delta R_o$ for the series $R_o$ by minimizing some norm of $\Delta R_o$, e.g. the norm L1 which is expressed by the function:

$$G = |\Delta R_o|$$

under the noise constraint:

$$T_o^{min} > (R_o + \Delta R_o)*W > T_o^{max}$$

and under a frequency constraint:

$$F(A'_o(\omega)) = F(A_o(\omega)),$$

where $\omega$ belongs to the frequency domain $[0, \omega_W]$; $A'_o$ is the acoustic impedance profile associated with the series $R'_o = R_o + \Delta R_o$; F is the Fourier transform; and $\omega_W$ is the lowest significant frequency in the domain to which the signature W belongs.

The first constraint is a noise constraint for limiting the set of solutions to a permitted domain in the space of possible solutions. The second constraint serves to provide a second limit to the domain of possible solutions. In this domain, the solution $\Delta R_o$ is chosen which has a minimum absolute value.

The process of minimizing this function $\Delta R_o$ may be performed by means of a commercially available computer program which codifies one of the numerous suitable linear programming algorithms. By way of example, use has been made of IMSL (International Mathematical and Scientific Library) software which codifies the well-known simplex algorithm.

These two constraints (1) and (2) (I.1.3, FIG. 3) make it possible to take account of the fact that the series of reflection coefficients $R_o$ seen by the surface seismic survey is not exactly the same as that seen by the downhole seismic survey or by the borehole logging. Further, when this surface seismic survey convolution equation is solved, it is solved in the frequency domain of the signature W whose lower limit frequency is $\omega_W$. The frequency constraint is used in order to compensate for loss of low frequency information in the surface seismic survey.

F is the matrix associated with the Cooley Turkey fast Fourier transform (FFT) restricted to the useful frequency band. Naturally, the reflection coefficients $a_o(n)$ are previously linearized as a function of $\Delta r_o(n)$ and an equation of the following type is obtained for each sample $a_o$ $$a'_o(n) \simeq a_o(n)[1 + 2r_o(n)]$$

After determining the series $\Delta R_o$, the series $R'_o$ is determined such that said series is equal to the previously determined series $R_o$ plus the correcting series $\Delta R_o$ (I.1.4 in FIG. 3).

In this case, the following processing makes use of the new series determined in this way, with said series $R_o$ corresponding to the series $R'_o$.

Figure 4:
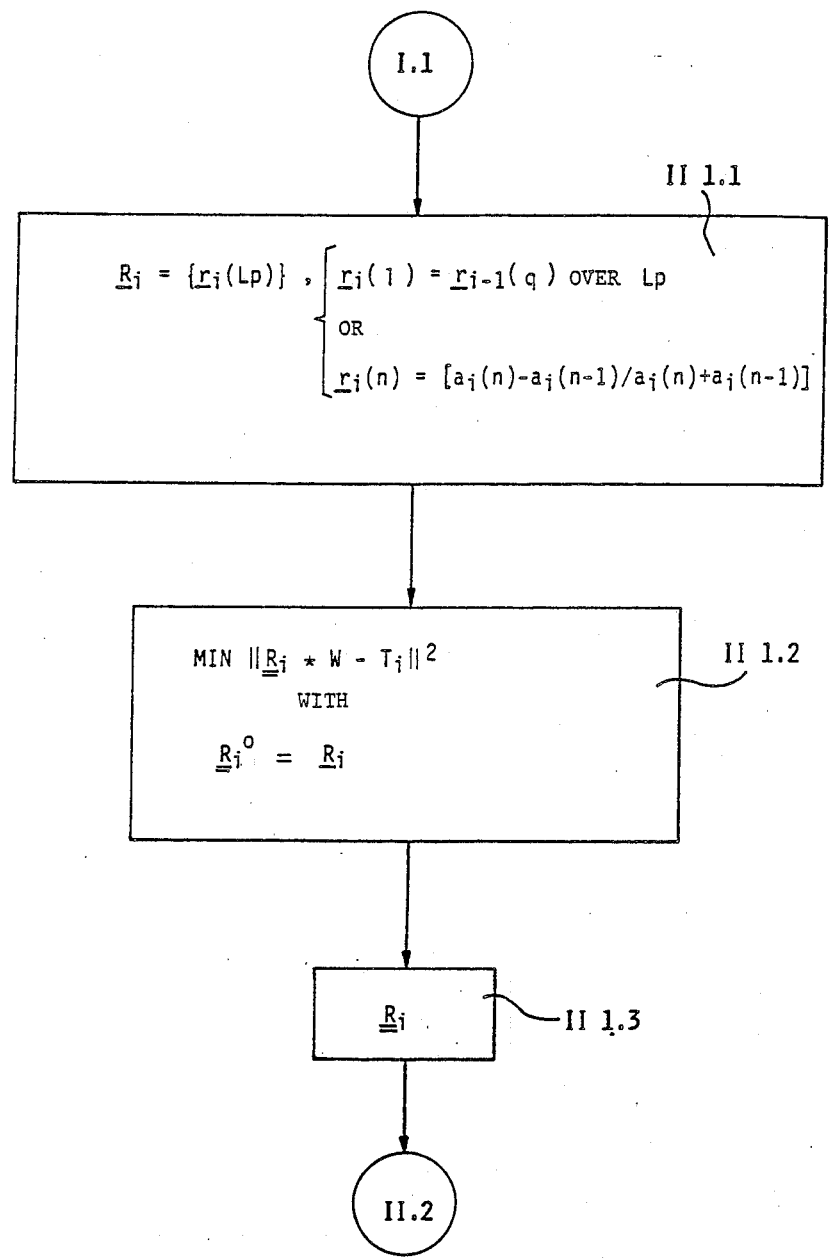
FIG. 4 shows a particular implementation of stage II.1 in FIG. 2.

FIG. 4 shows details of the various stages for performing two estimates of the series of reflection coefficients $R_i$ for a trace $T_i$:

a first estimate (II.1.1, FIG. 4) which consists in taking the reflection coefficients of the series $R_{i-1}$ along the correlation lines, and in using same-value reflection coefficients or in recalculating them; and in seeking new positions for the reflection coefficients about the solution which has just been found. This is done by finding the series of reflection coefficients for which the function E is at a minimum; this solution is found by successive approximations to each of the reflection coefficients in the series $\underline{R}_i$ taken as the initial value $\underline{R}_i^o$ for the looked for series until a minimum is obtained for this function E. The solution found provides the series $\underline{R}_i$ (II.1.3, FIG. 4).

Figure 5:
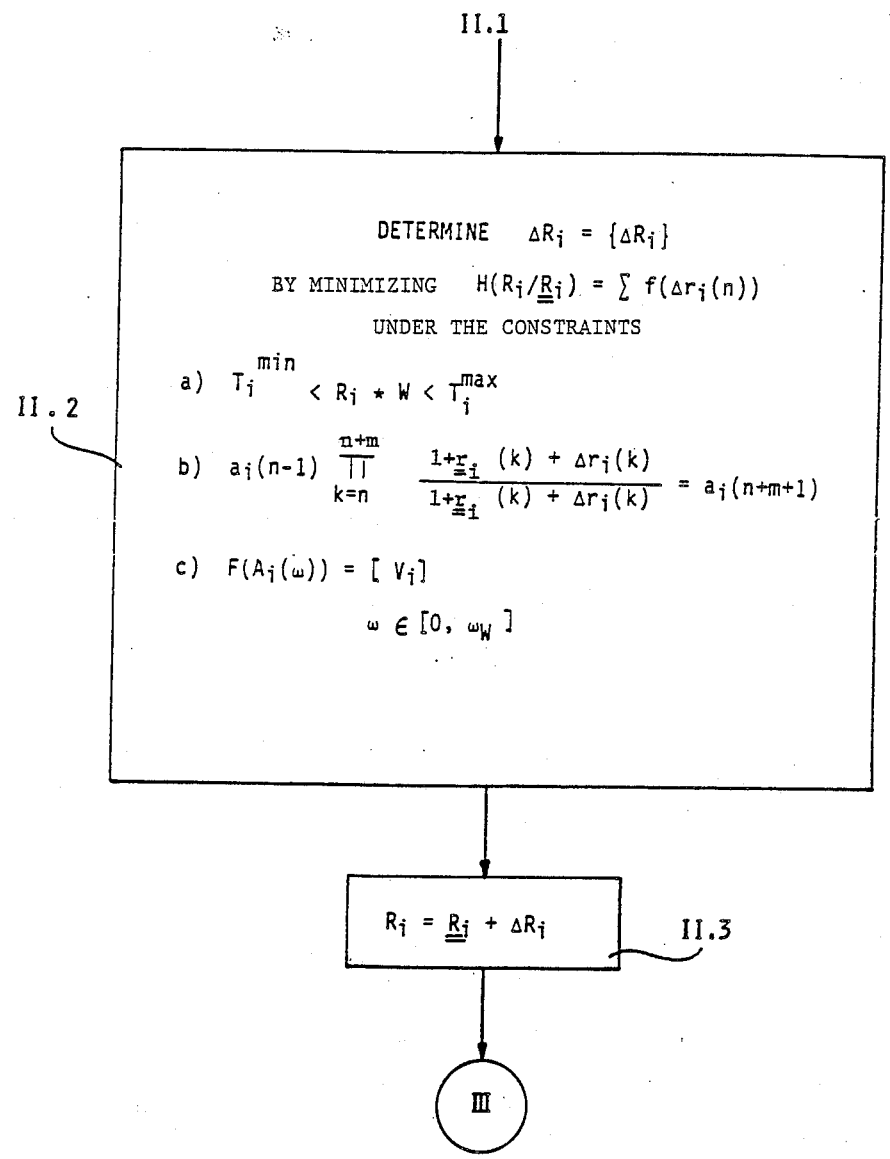
FIG. 5 shows a variant implementation of stage II.2 in FIG. 2.

FIG. 5 shows a variant implementation of stage II.2 in FIG. 2. In this variant, the function:

$$H(R_i/\underline{R}_i) = \Sigma f(\Delta r_i(n))$$

is minimized under a frequency constraint which is now:

$$F(A_i(w)) = [V_i]$$

where w belongs to the frequency domain $[0, w_W]$.

This frequency constraint is preferably additional to the other two constraints (a) and (b) described in detail with reference to FIG. 2. This constraint is of the same type as the constraint mentioned in redetermining the series $R_o$. It serves to take account of the fact that the Fourier transform of the acoustic impedance coefficients in the frequency domain is equal to a fixed vector of N samples for the trace i.

The Fourier transform of the acoustic impedance $A_i(w)$ is an N-coefficient vector which, in accordance with the invention, corresponds to a vector $V_i$ deduced from the stacking velocities determined while processing the surface seismic survey by conventional methods. This Fourier transform may, in another implementation of the invention, correspond to the Fourier transform of the series of estimated reflection coefficients $\underline{R}_i$.

FIG. 8 illustrates by way of example a seismic section comprising seismic traces $T_i$ obtained by surface seismic measurements. An acoustic impedance profile $A_o$ is also shown in FIG. 9.

FIG. 10 shows the stratigraphic model of the subsurface obtained from the seismic section of FIG. 8 and the profile $A_o$ of FIG. 9 by implementing the invention.

What is claimed is:

1. A method of establishing a stratigraphic model of the subsurface from an acoustic impendance profile $A_o = \{a_o(n), n=1, N\}$ corresponding to a series of reflection coefficients $R_o = \{r_o(n), n=1, N\}$, where n is an index relating to the depth sampled in time t, and from a seismic section comprising a plurality of seismic traces $T_i(t), i=0, I$ recorded in response to the emission of a seismic wave of signature $W(t)$, the method comprising the steps of;
   successively determining each series of coefficients $R_i = \{r_i(n), N=1, N\}$ by minimizing a cross-entropy function $H(R_i/\underline{R}_i)$ between firstly a series $\underline{R}_i$ obtained from the series $R_{i-1}$ and a set of one or more seismic traces $\{T_{i-j}, T_{i+j}\}$, and secondly the looked-for series $R_i$, said minimization being performed under pre-established constraints;
   determining the acoustic impedance profiles $A_i = \{a_i(n)\}$ corresponding to the series $R_i$; and
   establishing said stratigraphic model of the subsurface from the acoustic impedance profiles $A_i$.

2. The method according to claim 1, wherein said pre-established constraints include constraints related to the noise on the traces $T_i(t)$.

3. The method according to claim 1, wherein said pre-established constraints related to geology.

4. The method according to claim 1, wherein said pre-established constraints related to the frequency band of the signature $W(\omega)$.

5. The method according to claim 2, wherein said constraints related to the noise observed to the traces $T_i(t)$ are expressed by the equation:

$$T_i^{min} < R_i * W < T_i^{max}$$

in which the values $T_i^{min}$ and $T_i^{max}$ correspond respectively to the bottom limit and the top limit obtained by correlating a plurality of traces $[T_{i-j}, T_{i+j}]$ on either side of the trace $T_i(t)$.

6. The method according to claim 4 wherein said constraints related to the frequency of the signature $W(\omega)$ are expressed by the equation:

$$F(A_i(\omega)) = [V_i]$$

in which $F(A_i(\omega))$ is the Fourier transform of the acoustic impedance, $[V_i]$ is a predetermined vector and belongs to the frequency domain $[0, \omega W]$, in which $\omega W$ is the minimum frequency of $W(\omega)$.

7. The method according to claim 6, wherein the predetermined vector $[V_i]$ ccorresponds to the stacking velocities obtained from the surface seismic measurements.

8. The method according to claim 6, wherein the predetermined vector $[V_i]$ corresponds to the Fourier transform of the series of estimated reflection coefficients $\underline{R}_i$.

9. The method according to claim 1, comprising the step of determining a series $\Delta R_i = \{\Delta r_i(n)\}$ representative of a corrective value such that $R_i = \underline{R}_i + \Delta R_i$, by minimizing the cross-entropy function:

$$H(R_i/\underline{R}_i) = \sum_i^N f(\Delta r_i)$$

10. The method according to claim 9, wherein the function f is given by the following equation:

$$f(\Delta R_i) = 1 - o|\underline{n}(n) - n(n)|$$

11. The methof according to claim 9, wherein the function f is given by the following equation:

$$f(\Delta R_i) = |\underline{r}_i(n) - r_i(n)|$$

12. The method according to claim 9, wherein said constraints related to geology are expressed by the equation;

$$a_i(n-1) \prod_{k=n}^{n+m} \frac{1 + r_i(k) + \Delta r_i(k)}{1 - r_i(k) + \Delta r_i(k)} = a_i(n + m + 1)$$

in which $a_i(n-1)$ and $a_i(n+m+1)$ are the accustic impedance values of two strata separated by m samples which remain constant from index $i-1$ to index i.

13. The method according to claim 1, wherein the series $\underline{R}_i$ is obtained by:
   (a) initially:
   determining the signature w from the seismic trace $T_o$ and the series $R_o$ by deconvolution of the equation;

$$T_0 = W * R_0$$

with the operator * representing a convolution product;
   determining correlation lines Lp from a plurality the series $(T_{i-j}, T_{i+j})$ on either side of the seismic trace $T_i$; and
   (b) then, for index i=1 to I;
   calculating a series $\underline{R}_i = [\{r_i(n)\}$ whose values are taken from the series $R_{i-1}$ and rearranged in accordance with the correlation lines Lp; and
   performing an iterative process using the series $R_i$ for it initial values to calculate an estimate $\underline{R}_i$ whose convolution product with the signature W is as close as possible to the trace $T_i$.

14. The method according to claim 13, wherein the series $\underline{R}_1$ is obtained by minmizing (in a least squares sense) the difference between the tract $T_i$ and the convolution product $\underline{R}_i * W$;

$$\min ||\underline{R}_i * W - T_i||^2$$

by using the series $\underline{R}i$ for the initial values.

15. The methed according to claim 13, wherein the series $\underline{R}_i$ is obtained in such a manner that the convolution product $\underline{R}_i * W$ lies within the interval $[T_i min, T_i max]$ by minimizing the quantity outside said interval and by using the series $\underline{R}i$ for initial values.

16. the method according to claim 13, wherein the series $\underline{R}_i = \{\underline{r}_i(n)\}$ is calculated from the series $\underline{A}_i = \{\underline{a}_i(n)\}$ using the equation:

$$r_i(n) = (\underline{a}_i(n) - \underline{a}_i(n-1))/(\underline{a}_i(n) + \underline{a}_i(n-1))$$

where the series $\underline{A}_i$ is such that $\underline{a}_i(L) = \underline{a}_{i-1}(q)$ situated on the same correlation line Lp, or between two same correlation lines.

17. The method according to claim 1, wherein the reflection coefficients defined by the series $R_o$ are redetermined by estimating noise by correletion over a plurality of traces on either side of the trace $T_o$ in such a manner as to obtain a lower limit $T_o^{min}$ and an upper limit $T_o^{max}$, and then by seeking a series $R_o$ by deconvolution of the trace $T_o$ and the signature W within the limits imposed by the lower and upper limits $T_o^{min}$ and $T_o^{max}$.

18. The method according to claim 19, wherein the reflection coefficients of the series $R_o$ are redetermined in a manner which includes the following stage: minimizing the function $|\Delta R_o|$ representative of a series of corrective values for $R_o$ under pre-established constraints.

19. The method according to claim 18, wherein the reflection coefficients of the series $R_o$ are redertermined under constraints related to the noise observed on the trace $T_o$.

20. The method according to claim 18, wherein the reflection coefficients of the series $R_o$ are redetermined under constrainst related to the frequency domain of the signature $W(\omega)$.

21. The method according to claim 19, wherein the constraints related to the noise observed on the trace $T_o$ are expressed by the equation:

$$T_o^{min} < (R_o + \Delta R_o) * W < T_o^{max}$$

22. The metod according to claim 20, wherein the constraints related to the frequency domain of the signature $W(\omega)$ are expressed by the equation:

$$F(A'_o(\omega)) = F(A_o(\omega))$$
$$\omega c[0, \omega_W]$$

in which $A'_o$ is the acoustic impedance profile associated with the series $R'_o = R_o + \Delta R_o$, where $F(A'_o(\omega))$ is the Fourier transform of said impedance profile and $F(A_o(\omega))$ is the Fourier transform of the acoustic impedance $A_o$, and in which $\omega_W$ is the lowest meaningful frequency in the domain to which W belongs.

* * * * *